United States Patent
Suchla

[15] 3,645,235
[45] Feb. 29, 1972

[54] SHELTER FEEDER

[72] Inventor: John R. Suchla, 2629 2nd St. N., Minneapolis, Minn. 55411

[22] Filed: Apr. 13, 1970

[21] Appl. No.: 27,908

[52] U.S. Cl. .......................................... 119/51 R, 119/52 R
[51] Int. Cl. ........................................................... A01k 05/00
[58] Field of Search ........................ 119/51 R, 52 R, 55, 61

[56] References Cited

UNITED STATES PATENTS

| | | | |
|---|---|---|---|
| 2,918,901 | 12/1959 | Poulsen | 119/51 R |
| 2,682,255 | 6/1954 | Kleeman | 119/51 R |
| 2,524,502 | 10/1950 | Wilkinson | 119/51 R |
| 2,789,532 | 4/1957 | Hoebing | 119/51 R |
| 2,707,454 | 5/1955 | Wilkinson | 119/51 R |

*Primary Examiner*—Hugh R. Chamblee
*Attorney*—Burd, Braddock & Bartz

[57] ABSTRACT

An enclosure having one open side covering a bird-feeding hopper. A bearing assembly rotatably supports the shelter on an upright post. A wind vane is secured to and extends from the open side of the shelter so that the open side of the shelter is always downwind.

10 Claims, 8 Drawing Figures

PATENTED FEB 29 1972
3,645,235
SHEET 1 OF 2
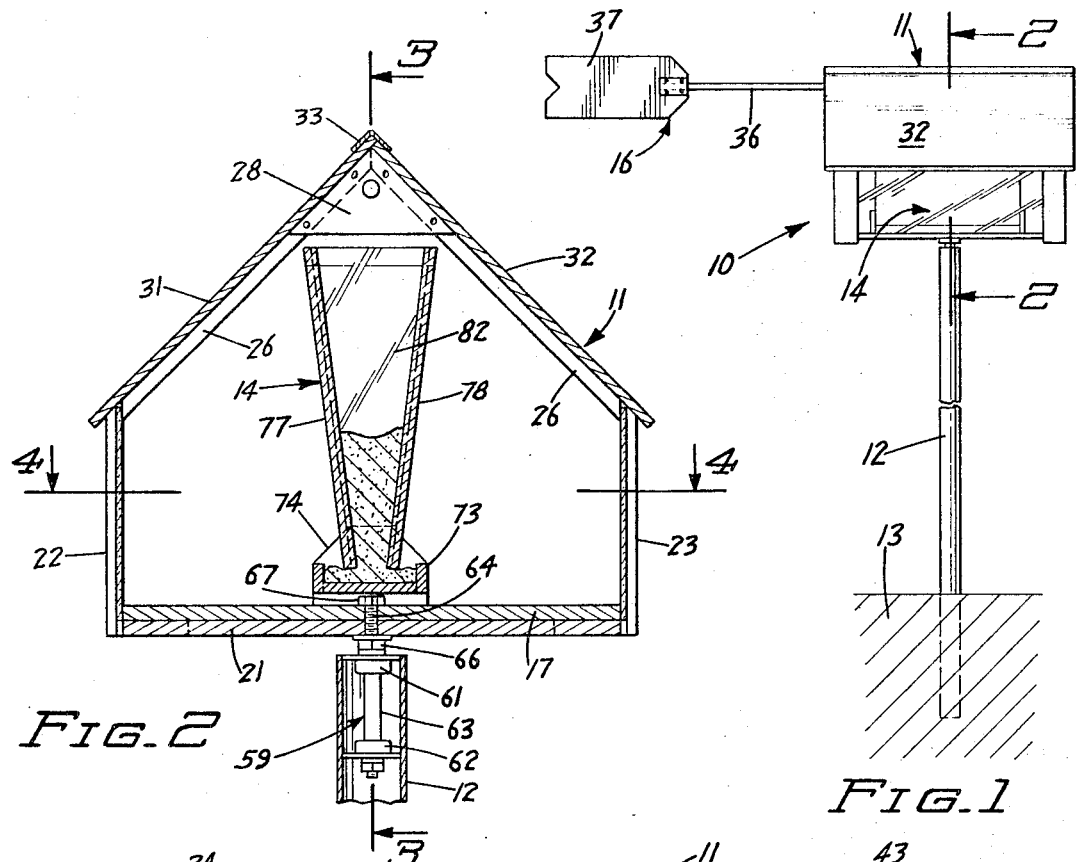
Fig. 1
Fig. 2
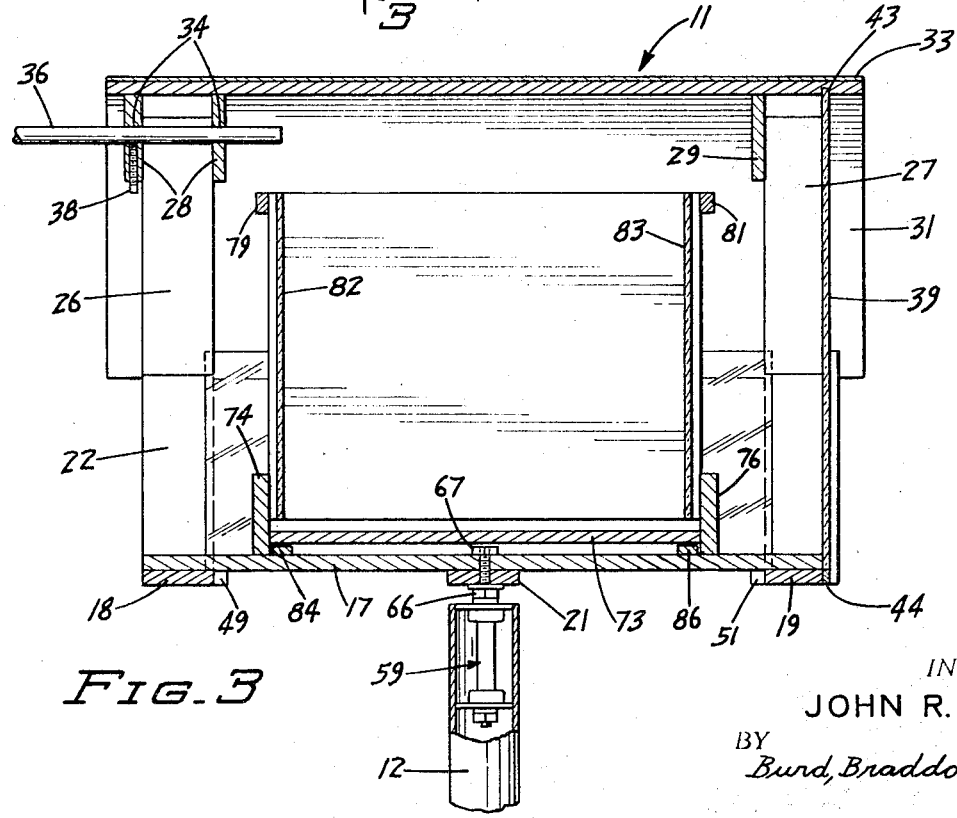
Fig. 3
INVENTOR.
JOHN R. SUCHLA
BY Burd, Braddock & Bartz
ATTORNEYS

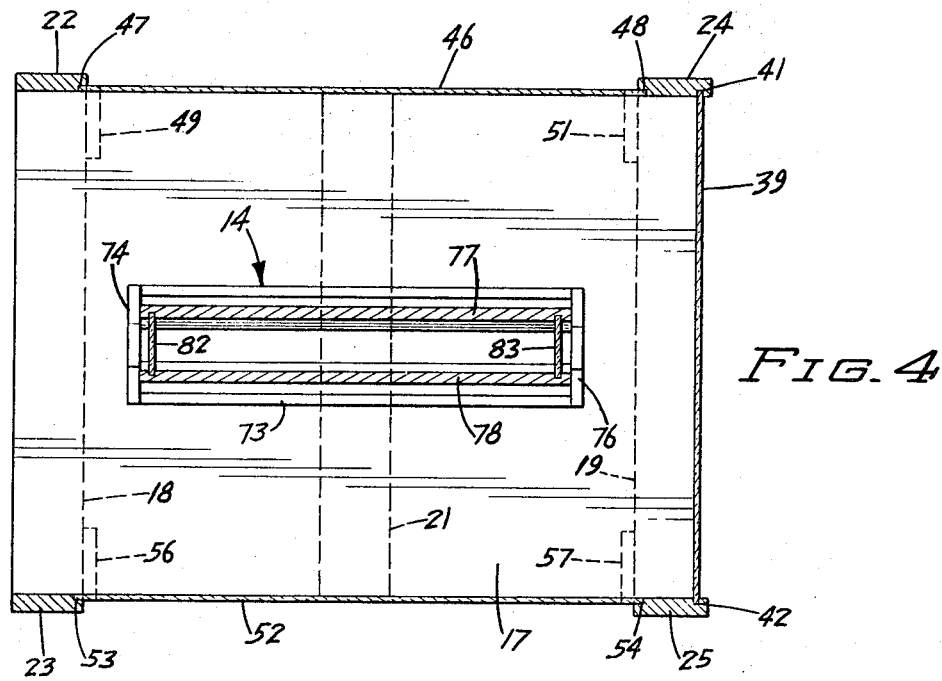
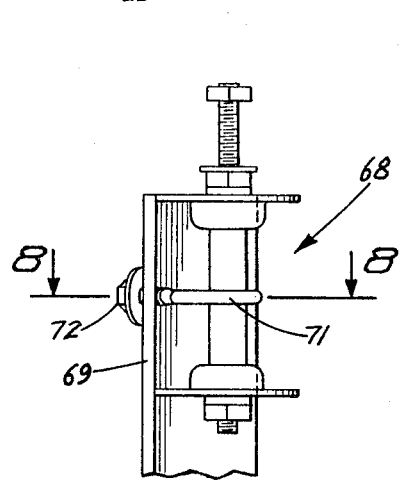
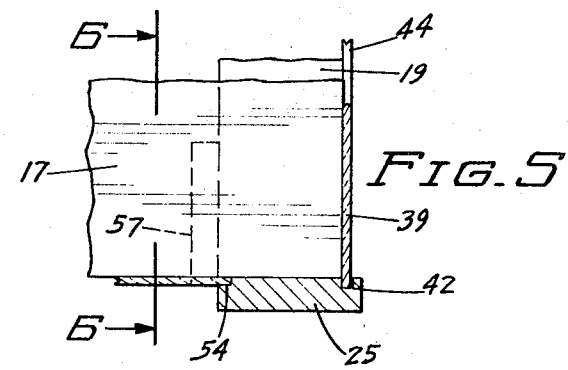
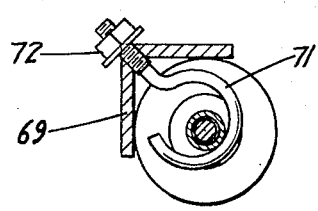
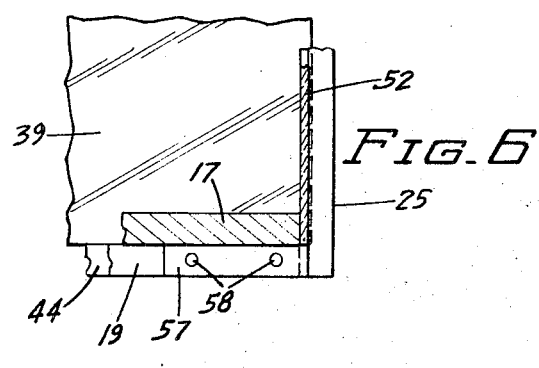
INVENTOR.
JOHN R. SUCHLA
BY
Burd, Braddock & Bartz
ATTORNEYS

SHELTER FEEDER

BACKGROUND OF INVENTION

Numerous bird feeders have been designed with vertical rotatable supports so that the feeder will turn with the change in the direction of the wind. These feeders are boxlike structures having a roof or top to protect the bird feed from the snow and rain. These boxlike bird feeders have a relatively large open area providing ready access to the feed. Separate feed hoppers are not used with enclosures to shelter the feeding area for the birds. These feeders do not minimize the spillage and scattering of the feed, as the feeding area is not confined within an enclosure.

SUMMARY OF INVENTION

The invention relates to a bird-feeding apparatus having a movable shelter supporting a feed-dispensing unit. The shelter has a feeding area adjacent the feed-dispensing unit which is protected from the wind, rain and like weather elements. The shelter has a generally horizontal platform rotatably mounted on an upright support. A plurality of upright supports, secured to and extended upwardly from the platform, support a roof which covers the platform and feeding area. The sides and one end of the shelter between the roof and the platform are closed with upright transparent means to provide for maximum viewing from the feeding area. One end of the shelter is open to provide for ingress and egress of birds from the feeding area. A wind vane secured to the shelter maintains the forward closed end of the shelter into the wind, keeping the open end of the shelter downwind.

In the Drawings:

FIG. 1 is a side elevational view of the bird-feeding apparatus of the invention looking in a direction normal to the wind direction;

FIG. 2 is an enlarged sectional view taken along the line 2—2 of FIG. 1;

FIG. 3 is a sectional view taken along the line 3—3 of FIG. 2;

FIG. 4 is a sectional view taken along the line 4—4 of FIG. 2;

FIG. 5 is an enlarged sectional view of a forward corner of the bird-feeding apparatus;

FIG. 6 is a sectional view taken along the line 6—6 of FIG. 5;

FIG. 7 is an elevational view of a modified bearing assembly and support for the bird-feeding shelter; and FIG. 8 is a sectional view taken along the line 8—8 of FIG. 7.

Referring to the drawings, there is shown in FIG. 1 a bird-feeding apparatus 10 set up for use in an appropriate location. The apparatus 10 comprises a shelter or enclosure, indicated generally at 11, supported on top of an upright support or pole 12. The lower end of pole 12 is anchored in the ground 13. The shelter 11 has an open end and surrounds a feed-dispensing unit, indicated generally at 14, for storing bird feed and seed. The feed-dispensing unit 14 is located in a bird-feeding area within the shelter, thereby minimizing the spilling and scattering of feed from the shelter. Extended rearwardly from the shelter is a vane 16 for keeping the enclosed forward end of the shelter headed into the wind and thereby protecting the inside of the shelter from rain, snow, and other adverse weather.

Shelter 11 has a generally rectangular flat base, platform, or floor 17 attached to end crossmembers 18 and 19 and a middle crossmember 21. Secured to the opposite ends of the crossmembers 18 and 19 are upright posts 22, 23, 24 and 25. Connectors, as nails, screws, dowels and glue are used to attach the lower portions of the posts to the ends of the crossmembers 18, 19, and 21, as well as to the adjacent portions of the floor 17.

The roof or cover of the shelter is mounted on the top of the posts 22, 23, 24 and 25. The roof comprises a first pair of upwardly converging rafters 26 mounted on the top of the posts 22 and 23 and a second pair of rafters 27 mounted on the top portions of the posts 24 and 25. Upper portions of the rafters 26 are secured together with gusset members 28. In a similar manner, a gusset member 29 secures the upper portions of the rafters 27. The top of the shelter is enclosed with roof panels 31 and 32 mounted on the rafters 26 and 27. An elongated ridge or angle member 33 is secured to the adjacent upper portions of the roof panel to close the crack along the top of the roof.

As shown in FIG. 3, the gusset members 28 have longitudinally aligned holes 34 for accommodating a rod 36. A flat vertical tail 37, shown in FIG. 1, is attached to the rear portion of rod 36 to form the vane 16. A fastener 38, in one gusset 28, engages rod 36 and holds the rod in the selected position relative to the shelter. The fastener 38 permits the rod 36 to be removed from the shelter, permits the adjustment of the angle of tail 37, and the spacing between the tail and the shelter to balance the shelter.

As shown in FIGS. 3 and 4, the front of the shelter is closed with an upright transparent front wall 39. Opposite edges of the front wall are located in upright grooves 41 and 42 in the posts 24 and 25, respectively, and a groove 43 is located in the roof panels 31 and 32. A transverse strip 44, attached to the crossmember 19, holds the transparent wall 39 in assembled relation with the posts 24 and 25 and roof panels 31 and 32.

The sides of the shelter 11 are closed with similar transparent walls. A transparent sidewall 46 extends between the posts 22 and 24. Opposite portions of the wall 46 are located in recesses 47 and 48 in the posts 22 and 24, respectively. Blocks 49 and 51, secured to the crossmembers 18 and 19, hold the sidewall 46 in the recesses 47 and 48. A similar transparent sidewall 52 extends between the upright posts 23 and 25. These posts have upright recesses 53 and 54 for accommodating end portions of the sidewall 52. Stop blocks 56 and 57, secured to the crossmembers 18 and 19, hold the sidewall 52 in assembled relation with the posts 23 and 25. As shown in FIGS. 5 and 6, the block 57 is secured with fasteners 58, as nails or screws, to the inside edge of the transverse crossmember 19. The outer end of block 57 extends under the sidewall 52. The sidewall 52 extends below the upper surface of the floor 17 to minimize the entrance of rain, snow and wind into the shelter. The front wall 39 and sidewalls 46 and 52 are flat rigid and transparent sheet members made from glass, plastic, paper and like materials.

The center portion of the base platform 17 is secured to a bearing assembly, indicated generally at 59, supported in the upper tubular portion of the support pole 12. As shown in FIG. 2, the bearing assembly 59 is confined within the tubular portion of the upper end of the pole 12 so as to protect the bearing structure from the weather and yet at the same time produce an attractive connecting structure between the shelter 11 and the pole 12. Bearing assembly 59 comprises an upper ball bearing unit 61 and a lower ball bearing unit 62 located within a housing 63. The housing 63 has end rings located with a tight press fit within the upper tubular portion of the pole 12, whereby the bearing assembly is held in assembled relation with the pole. An upright shaft 64 is carried by the bearings for rotation about a generally vertical axis. The shaft 64 extends through suitable holes in the crossmember 21 and floor 17. Nuts 66 and 67, threaded onto the shaft 64, secure the floor 17 to the shaft 64. The bearing assembly 59 is coupled to substantially the center of the floor 17 and is substantially balanced on the bearings 61 and 62. The front wall 39 is counterbalanced by the weight of the vane 16. As shown in FIG. 2, the shelter is laterally symmetrical on the bearing assembly 59.

Referring to FIGS. 7 and 8, there is shown an alternate bearing assembly, indicated generally at 68, mounted on an angle support pole 69. A hook 71, extended around the center portion of the bearing housing, is used to retain the bearing assembly 68 on the pole. The hook 71 has a threaded portion projected through a hole in the pole. A nut 72 on the threaded portion functions to clamp the bearing assembly 68 in fixed relation with respect to the pole 69. The details of the bearing assembly 68 are identical with the details of the bearing assembly 59.

Located within the shelter 11 is the feed-dispensing unit 14. As shown in FIGS. 2 and 3, the feed-dispensing unit 14 comprises an elongated trough or bunk 73 having a generally shallow U-shaped cross section. Opposite ends of the bunk 73 are secured to upright end stands 74 and 76. A hopper, comprising upwardly diverging walls 77 and 78, is secured to the end stands 74 and 76. As shown in FIG. 2, the lower edges of the walls 77 and 78 are spaced from the bottom of the bunk so that the feed is free to flow into the feeding area of the bunk. The upper ends of the walls 77 and 78 are secured to transverse spacing strips 79 and 81. Generally V-shaped transparent end walls 82 and 83 extend transversely between the opposite ends of the walls 77 and 78 to define a chamber for the storage of feed. The walls 77 and 78 extend in an upward direction and have a length so that when the feed-dispensing unit 14 is located within the enclosure, the upper edges of the walls 77 and 78 are located in close proximity to the roof panels 31 and 32.

The feed-dispensing unit 14 is longitudinally and centrally positioned within the housing. This position is located and maintained by the use of a pair of strips 84 and 86 nailed to the floor 17 adjacent the inside faces of the end stands 74 and 76, as shown in FIG. 3. The strips 84 and 86 fit into the recess in the bottom of the bunk and cooperate with adjacent end stands 74 and 76 of the hopper and side members of the hopper to centrally locate the feed bunk on the floor. Other locating structure, as pegs, blocks, or recesses in the floor 17 or bunk can be used to position the feed-dispensing unit 14 in the shelter. The central location of the feed-dispensing unit maintains bird walking space within the shelter all around the feed-dispensing unit.

In use, the shelter 11 is rotatably mounted on the support pole 12 with a bearing assembly 59. The vane 16, extended from the trailing or open side of the shelter, maintains the front of the shelter headed into the wind. Wind, rain, snow and like elements, are not carried within the shelter. The bearing assembly 59, with its pair of ball bearing units 61 and 62, rotatably supports the shelter for easy movement about an upright axis of the pole 12. The feed hopper, being within the shelter, can be used by birds that go into the open end of the shelter. Any feed or seed which is spilled will remain in the shelter. The transparent front wall and transparent sidewalls permit the birds to view the surrounding area while they are feeding. The birds will be reluctant to enter a closed shelter if they cannot observe the surrounding area. The feed-dispensing unit 14 can be removed from the shelter by merely releasing the end stands 74 and 76 from the strips 84 and 86 and withdrawing the dispensing unit through the open end of the shelter. The freely rotatable shelter 11, being positioned on the pole 12, is inaccessible to squirrels because of the horizontal extent of the floor 17.

While there is shown and described a bird-feeding apparatus, it is to be understood that various changes in size, construction and materials, as redwood, plastic and like construction materials, can be made by those skilled in the art without departing from the invention. The use of the feeding apparatus is not intended to be limited to feeding birds. The feeding apparatus can be used to feed other classes of living creatures, as insects, animals and humans.

The embodiments of the invention in which an exclusive property or privilege is claimed are defined as follows:

1. A feeding apparatus comprising: a fixed support, a shelter having a generally horizontal platform, a forward end and a rear end, means rotatably mounting the midportion of the platform on the support for movement of the shelter about a generally upright axis, at least a pair of generally upright spaced posts secured to each end portion of the platform, a roof located above and covering the platform secured to the upright posts, front wall means mounted on the platform and forward spaced upright posts closing the space between the roof, the platform, and the front spaced upright posts of the shelter, the space between the platform, roof and rear spaced upright posts being open, feed-dispensing means located within the shelter, a generally horizontal rod, a generally flat tail member secured to one end of the rod, the flat plane of the tail member being located in a generally vertical position, means connected to an upper portion of the rear end of the roof longitudinally mounting the rod on the roof with the tail member located rearwardly of the open rear end of the shelter whereby the open end is maintained downwind, and lock means operable to permit longitudinal positioning of the rod whereby the tail member can be selectively moved relative to the roof to balance the shelter on the means rotatably mounting the platform on the support.

2. The feeding apparatus of claim 1 wherein: the fixed support is an upright member having a tubular top portion, said means rotatably mounting the platform on the support comprising a bearing assembly located within said tubular top portion, said bearing assembly having rotatable means connected to the platform.

3. The feeding apparatus of claim 2 wherein: said bearing assembly has a pair of ball bearing units rotatably supporting the means connected to the platform.

4. The feeding apparatus of claim 1 wherein: the said means rotatably mounting the platform on the support comprises a bearing assembly mounted on the fixed support.

5. The feeding apparatus of claim 4 wherein: said bearing assembly has a pair of ball bearing units rotatably supporting the means connected to the platform.

6. The feeding apparatus of claim 1 wherein: the front wall means is transparent sheet material.

7. The feeding apparatus of claim 1 including: generally upright sidewall means located longitudinally in the side spaces between sides of the platform and sides of the roof.

8. The feeding apparatus of claim 7 wherein: said sidewall means close said side spaces and are of transparent sheet material.

9. The feeding apparatus of claim 1 wherein: the feed-dispensing means comprise a feed bunk and a feed storage hopper located above the feed bunk.

10. The feeding apparatus of claim 9 including: means coacting with the feed bunk and platform to centrally locate the feed bunk on the platform.

* * * * *